United States Patent
Zhang et al.

(10) Patent No.: US 11,789,957 B2
(45) Date of Patent: Oct. 17, 2023

(54) SYSTEM, METHOD, AND APPARATUS FOR QUERYING A DATABASE

(71) Applicant: Alibaba Group Holding Limited, Grand Cayman (KY)

(72) Inventors: Guangzhou Zhang, Hangzhou (CN); Xiaobin Lin, Hangzhou (CN); Xiaojian Fan, Hangzhou (CN); Xianming Dou, Hangzhou (CN); Wenjing Zeng, Hangzhou (CN); Zhengzhong Zhou, Hangzhou (CN); Liangchun Xiong, Hangzhou (CN); Wenjie Zhang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 139 days.

(21) Appl. No.: 16/954,286

(22) PCT Filed: Dec. 25, 2018

(86) PCT No.: PCT/CN2018/123437
§ 371 (c)(1),
(2) Date: Jun. 16, 2020

(87) PCT Pub. No.: WO2019/128978
PCT Pub. Date: Jul. 4, 2019

(65) Prior Publication Data
US 2021/0097075 A1    Apr. 1, 2021

(30) Foreign Application Priority Data
Dec. 29, 2017    (CN) .......................... 201711482536.1

(51) Int. Cl.
*G06F 16/2458* (2019.01)
*G06F 16/27* (2019.01)
(Continued)

(52) U.S. Cl.
CPC ...... *G06F 16/2471* (2019.01); *G06F 11/3433* (2013.01); *G06F 16/2365* (2019.01); *G06F 16/2455* (2019.01); *G06F 16/27* (2019.01)

(58) Field of Classification Search
CPC .. G06F 16/2471; G06F 16/27; G06F 16/2455; G06F 16/2365; G06F 11/3433
See application file for complete search history.

(56) References Cited

U.S. PATENT DOCUMENTS

| | | |
|---|---|---|
| 6,778,977 B1 | 8/2004 | Avadhanam et al. |
| 6,795,819 B2 | 9/2004 | Wheeler et al. |

(Continued)

FOREIGN PATENT DOCUMENTS

| | | |
|---|---|---|
| CN | 101916280 A | 12/2010 |
| CN | 106339432 A | 1/2017 |

(Continued)

OTHER PUBLICATIONS

Supplementary European Search Report to corresponding EP Application No. 18 89 5044 dated Aug. 17, 2021 (9 pages).

(Continued)

*Primary Examiner* — Huawen A Peng
(74) *Attorney, Agent, or Firm* — James J. DeCarlo; Greenberg Traurig, LLP

(57) ABSTRACT

A database system as well as a method and an apparatus for querying a database are disclosed herein. In one embodiment, a system comprises a master database, at least one slave database, and a query processing unit. The master database has a data connection with the slave database, and the slave database has a data connection with the query processing unit. The query processing unit is configured to split a query request into query operation instructions having non-overlapping query ranges, send the split query operation instructions to the same or different slave databases to (Continued)

perform the query operations, and return the query results. The disclosed embodiments improve query efficiency.

17 Claims, 9 Drawing Sheets

(51) Int. Cl.
*G06F 16/2455* (2019.01)
*G06F 16/23* (2019.01)
*G06F 11/34* (2006.01)

(56) References Cited

U.S. PATENT DOCUMENTS

| | | | |
|---|---|---|---|
| 7,403,942 B1 | 7/2008 | Bayliss | |
| 7,702,624 B2 | 4/2010 | King et al. | |
| 7,831,620 B2* | 11/2010 | Barsness | G06F 16/90335 |
| | | | 707/790 |
| 7,991,745 B2 | 8/2011 | Bourbonnais et al. | |
| 8,065,264 B1 | 11/2011 | Achanta | |
| 8,078,825 B2 | 12/2011 | Oreland et al. | |
| 8,200,657 B2 | 6/2012 | Purcell et al. | |
| 8,370,362 B2 | 2/2013 | Szabo | |
| 8,489,622 B2 | 7/2013 | Joshi et al. | |
| 8,543,566 B2 | 9/2013 | Weissman et al. | |
| 8,615,521 B2 | 12/2013 | Jonas | |
| 8,620,937 B2 | 12/2013 | Jonas | |
| 8,655,867 B2 | 2/2014 | Collins et al. | |
| 8,768,731 B2 | 7/2014 | Moore | |
| 8,825,872 B2 | 9/2014 | Reisman | |
| 8,880,549 B2* | 11/2014 | Leff | G06F 16/252 |
| | | | 707/769 |
| 9,037,589 B2 | 5/2015 | Anderson | |
| 9,063,710 B2 | 6/2015 | Bornhoevd et al. | |
| 9,110,947 B1* | 8/2015 | Watzke | G06F 16/221 |
| 9,734,169 B2 | 8/2017 | Redlich et al. | |
| 2005/0187977 A1 | 8/2005 | Frost | |
| 2008/0319967 A1* | 12/2008 | Hutchison | G06F 16/2471 |
| 2009/0012932 A1* | 1/2009 | Romem | G06F 11/18 |
| 2010/0100556 A1* | 4/2010 | Correll, Jr. | G06F 16/2471 |
| | | | 707/754 |
| 2014/0114994 A1 | 4/2014 | Lindblad et al. | |
| 2014/0244687 A1* | 8/2014 | Shmueli | G06F 16/28 |
| | | | 707/780 |
| 2014/0304294 A1* | 10/2014 | Sharma | G06F 16/172 |
| | | | 707/769 |
| 2015/0149409 A1* | 5/2015 | Lee | G06F 16/27 |
| | | | 707/623 |
| 2016/0092542 A1 | 3/2016 | Shivarudraiah | |
| 2016/0098450 A1 | 4/2016 | Tandon et al. | |
| 2017/0046388 A1* | 2/2017 | Kirk | G06F 16/24544 |
| 2017/0116276 A1* | 4/2017 | Ziauddin | G06F 16/2454 |

FOREIGN PATENT DOCUMENTS

| | | |
|---|---|---|
| CN | 106372177 A | 2/2017 |
| JP | 2007-531087 A | 11/2007 |
| JP | 2013-152512 A | 8/2013 |

OTHER PUBLICATIONS

International Search Report to corresponding International Application No. PCT/CN2018/123437 dated Apr. 1, 2019 (2 pages).

* cited by examiner

SYSTEM, METHOD, AND APPARATUS FOR QUERYING A DATABASE

CROSS-REFERENCE TO RELATED APPLICATIONS

The present application is the national stage entry of Int'l Appl. No. PCT/CN18/123437 filed Dec. 25, 2018 and entitled "DATABASE SYSTEM, AND METHOD AND DEVICE FOR QUERYING DATABASE" which claims priority to Chinese Patent Application No. 201711482536.1, filed on Dec. 29, 2017 and entitled "DATABASE SYSTEM AND METHOD AND APPARATUS FOR QUERYING DATABASE," both of which are incorporated herein by reference in their entirety.

BACKGROUND

Technical Field

The disclosed embodiments relate to a database, and specifically, to a database system. The disclosed embodiments also relate to a method for querying a database and an apparatus for querying a database. The disclosed embodiments further relate to a method for assigning a query task and an apparatus for assigning a query task. The disclosed embodiments further relate to a method for executing a database query and an apparatus for executing a database query. The disclosed embodiments further relate to a method for performing a database query and an apparatus for performing a database query.

Description of the Related Art

A non-distributed database typically uses master-slave architecture with one master database plus one or a plurality of slave databases.

In this architecture, the master database is externally writable. When data in the master database is updated, the data is synchronized to the slave database through a transaction log. Generally, one master database corresponds to one or a plurality of slave databases, and each slave database stores a complete set of data consistent with that of the master database.

When the master database malfunctions, each slave database can serve as a standby database to replace the master database, thereby improving availability. Each slave database can execute a query request and thus can share the query load of the master database.

In current architectures, a structured query language (SQL) query operation can be executed in only one database. That is, an SQL query can be executed in only the master database or only one slave database. As a result, one slave database may be busy executing a large, complex SQL query operation with high load and slow response while other slave databases are idle. In particular, the slave database typically executes complex operations such as daily report generation and data checking at a specific time (e.g., in the early morning), in addition to serving as a daily query database. In this case, the execution of a large, complex SQL query operation may even fail to provide a query service due to system overload.

Given the above, existing non-distributed databases with a master-slave architecture cannot utilize other standby database resources for complex queries, resulting in slow query response times and overall inefficiency.

SUMMARY

The present application provides a database system to solve these problems of existing databases with a master-slave architecture. The disclosed embodiments additionally provide a method for querying a database, a method for assigning a query operation, a method for executing a database query, and a method for performing a database query, as well as apparatuses corresponding to these methods.

In one embodiment, the disclosure provides a database system. The database system comprises a master database, at least one slave database, and a query processing unit. The master database has a data connection with the slave database, and the slave database has a data connection with the query processing unit. The query processing unit splits a query request into query operation instructions having non-overlapping query ranges, sends the split query operation instructions to the same or different slave databases to perform the query operations, and returns the query results.

In one embodiment, the disclosure further provides a method for querying a database comprising: acquiring a query request for a database; splitting the query request into query operation instructions for slave databases having non-overlapping query ranges; executing the query operation instructions for the slave databases; and providing a result of the query request to a requester of the query request.

In one embodiment, the disclosure further provides a method for assigning a query operation comprising: acquiring a query request for a database and splitting the query request into query operations for slave databases having non-overlapping query ranges.

In one embodiment, the disclosure further provides a method for executing a database query comprising: acquiring a query task; executing a query operation specified by the query task; and providing a result of the query operation to a receiver specified by the query task.

In one embodiment, the disclosure further provides a method for performing a database query comprising: acquiring a query task; acquiring query results of other query operations specified by the query task; integrating the query results; and providing a result of integration to a receiver specified by the query task.

In one embodiment, the disclosure further provides an apparatus for querying a database comprising: an acquisition unit, configured to acquire or receive a query request for querying a database; a splitting unit, configured to split the query request into query operation instructions for slave databases having non-overlapping query ranges; an execution unit, configured to execute the query operation instructions for the slave databases; and a providing unit, configured to provide a query result of the query request to a requester of the request.

In one embodiment, the disclosure further provides an apparatus for assigning a query operation comprising: an acquisition unit, configured to acquire or receive a query request for a database; and a splitting unit, configured to split the query request into query operations for slave databases having non-overlapping query ranges.

In one embodiment, the disclosure further provides an apparatus for executing a database query comprising an acquisition unit, configured to acquire or receive a query task; an execution unit, configured to execute a query operation instruction specified by the query task; and a providing unit, configured to provide a result of the query operation to a receiver specified by the query task.

In one embodiment, the disclosure further provides an apparatus for performing a database query comprising: an acquisition unit, configured to acquire or receive a query task; a second acquisition unit, configured to acquire query results of other query operations specified by the query task; an integration unit, configured to integrate the query results; and a providing unit, configured to provide a result of integration to a receiver specified by the query task.

Compared with existing systems, one aspect of the disclosed database system provides the following advantages. The query processing unit splits a query request into query operation instructions having non-overlapping query ranges and sends the split query operation instructions to the same or different slave databases to perform the query operations so that that slave database resources can be effectively utilized, high query load on a certain, or a single, slave database can be avoided, and the effect of improving query efficiency can be achieved.

Compared with existing systems, one aspect of the method for querying a database provided in the present application has the following advantages. The query request is split into query operations for slave databases having non-overlapping query ranges, so that the query is offloaded to the slave databases, thereby achieving the function of effectively utilizing slave database resources and improving query efficiency.

Compared with existing systems, one aspect of the method for assigning a query operation provided in the present application has the following advantages. The query request is split into query operations for slave databases having non-overlapping query ranges, so that the query is offloaded to the slave databases, thereby achieving the function of effectively utilizing slave database resources and improving query efficiency.

Compared with existing systems, one aspect of the method for executing a database query provided in the present application has the following advantages. A result of a query operation specified by a query task can be sent to a specified receiver, thereby achieving the function of performing flexible queries and fully utilizing resources to share query load.

Compared with existing systems, one aspect of the method for performing a database query provided in the present application has the following advantages. Acquired results of query operations can be integrated and a result of integration can be provided to a receiver specified by a query task. The function of fully utilizing resources to share query load is achieved.

DETAILED DESCRIPTION

Many specific details are set forth in the following description to facilitate a full understanding of the disclosed embodiments. However, the disclosed embodiments can be implemented in many other manners than those described herein, and those skilled in the art can make similar derivations without departing from the essence of the disclosure. Therefore, the disclosure is not limited by the specific embodiments disclosed below.

Figure 1:
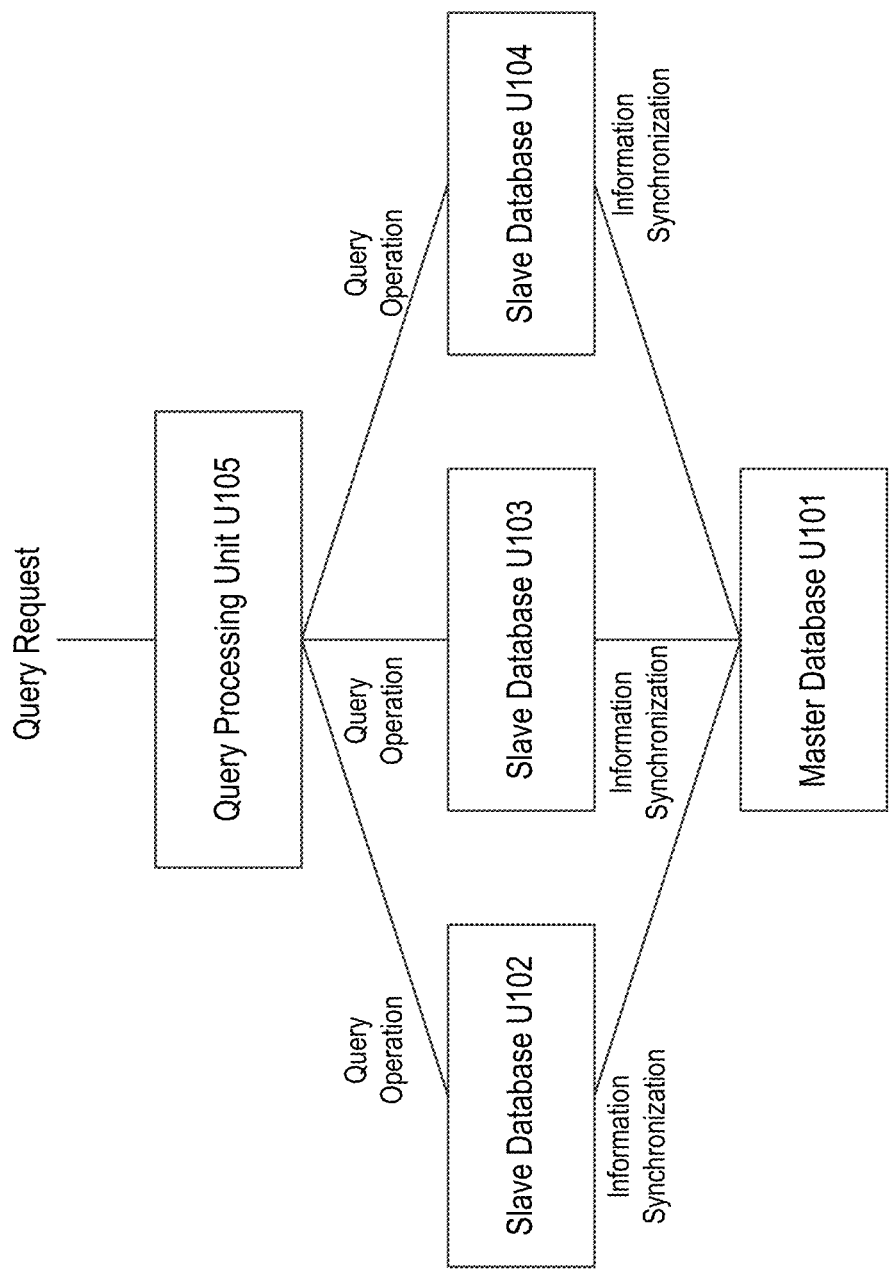
FIG. 1 is a block diagram of a database system according to some embodiments of the disclosure.

A first embodiment of the disclosure provides a database system, a block diagram of which is shown in FIG. 1.

In the illustrated embodiment, the system includes a master database (U101), a slave database (U102), a slave database (U103), a slave database (U104), and a query processing unit (U105). The master database (U101) has a data connection with each of the slave databases (U102, U103, U104), and each of the slave databases (U102, U103, U104) has a data connection with the query processing unit (U105).

As illustrated, the data connection may include a hardware connection, a software connection, or a combination of a hardware and software connection. In one embodiment, the hardware connection may be a wired network connection, such as an Ethernet connection. Alternatively, or in conjunction with the foregoing, the hardware connection may be a wireless network connection such as Bluetooth or a wireless local area network (WLAN). In some embodiments, the software connection may be an interface connection between various software protocols or program processes. In the illustrated embodiment, data and information can be exchanged through the data connection.

The master database (U101) externally receives and executes an update operation for a database (e.g., record addition, record modification, and record deletion). In response to the operation, database information is updated.

The slave databases (U102, U103, and U104) (respectively, and alternatively, numbered 0, 1, and 2) separately remain synchronized with the master database to ensure a set of database data is consistent with that of the master database. Thus, as an example, when the master database malfunctions, the slave databases can replace the master database to provide services provided by the original master database externally.

There may be many ways in which the slave databases (U102, U103, U104) can remain synchronized with the master database. In one embodiment, the master database transmits update information to the slave databases when the master database is updated. Then, the slave databases update their database data according to the update information of the master database. In another embodiment, the slave databases periodically check (based on their conditions), update information with the master database or a unit saving update information of the master database, and update their database data once an update occurs.

The slave databases (U102, U103, U104) further receive and respond to a query operation from the query processing unit (U105). The slave databases ensure database data is consistent with that of the master database through synchronization with the master database and thus can be used for providing a database query function.

In the illustrated embodiment, the query processing unit (U105) can send a query request to a corresponding slave database or split a query request into query operation instructions having non-overlapping query ranges. The query processing unit (U105) can then send the split query operation instructions to the same (or different) slave databases to perform the query operations, and return query results.

Specifically, the query processing unit (U105) can receive a query request for a database, generate a corresponding query operation instruction according to the query request, and then send the query operation instruction to a certain or specified slave database to perform a query operation for the slave database. For example, the query operation instruction may comprise a simple data query, and only a certain slave database needs to be queried. Alternatively, the query operation instruction may specify a slave database providing a query operation. Alternatively, the query processing unit (U105) may convert a query request into query operation instructions having non-overlapping query ranges and distribute the query instructions to the same or different slave databases to execute different query operations on different databases, to properly utilize the plurality of slave databases, help to improve efficiency, and decrease the data processing load of a query performed by a single slave database.

An example is provided below, where the query processing unit may split a query request and then distribute it to different slave databases to execute query operations. After receiving a query request for a database, the query processing unit splits the external query request into query operation instructions having non-overlapping query ranges. The query processing unit then performs the query operations on the slave databases (U102, U103, U104).

In general, the query operations having non-overlapping query ranges refer to the query operations performed on the slave databases that do not overlap. That is, different slave databases are queried for different records.

There may be various methods for splitting the external query request into query operations having non-overlapping query ranges. Various such methods are described below.

Method 1. In the first method, the query request is split into query operations for slave databases having non-overlapping query ranges according to distributed column values corresponding to a query object of the external query request. The distributed column values corresponding to a query object refer to that each record of the queried object corresponds to one value that can be used for specifying a slave database. The value is referred to as a distributed column value. An identifier of the slave database corresponding to the distributed column value can be obtained by processing the distributed column value.

For example, the queried object may comprise a population data table. Each record of the table may include information such as the city and population size. Thus, the distributed column values are columns of data of the table, where each piece of data corresponds to a row of records of the population data table.

After acquiring an external query request for the population data table, the query processing unit (U105) acquires distributed column values corresponding to the population data table. It converts the query request into a query for a specified distributed column value entry of the population data table. In some embodiments, a hash operation may be performed on each distributed column value. Then a modulo operation is performed according to the number of slave databases (3 in this embodiment). It is determined to perform query operations on the corresponding slave databases according to a remainder generated after the modulo operation.

For example, after distributed column values A0, B0, C0, D0 and so on, A1, B1, C1, D1 and so on, A2, B2, C2, D2, and so on, are subjected to the aforementioned processing, distributed column values with a remainder of 0 include A0, B0, C0, D0 and so on; distributed column values with a remainder of 1 include A1, B1, C1, D1 and so on; and distributed column values with a remainder of 2 include A2, B2, C2, D2 and so on.

Then the query operation performed on the slave database (U102) numbered 0 functions as various records corresponding to the distributed column values such as A0, B0, C0, and D0 with the remainder of 0.

The query operation performed on the slave database (U103) numbered 1 functions as various records corresponding to the distributed column values such as A1, B1, C1, and D1 with the remainder of 1.

The query operation performed on the slave database (U104) numbered 2 functions as various records corresponding to the distributed column values such as A2, B2, C2, and D2 with the remainder of 2.

The distributed column values corresponding to a query object include the following types:

I. Pre-Saved Distributed Column Values of the Query Object.

Distributed column value tables corresponding to various query objects of a database may be generated in advance. For example, an owner of the database may generate in advance distributed column values of each row of records of the query objects of the database. After the distributed column value tables of the query objects are generated, the distributed column value tables are stored and synchronously updated when the database is updated. When receiving an external query request, the query processing unit (U105) acquires distributed column values of a query object corresponding to this query request from the saved distributed column value tables corresponding to the query objects of the database.

The acquisition of distributed column values from saved distributed column value tables of query objects can simplify the steps of query and improve query efficiency. Moreover, since the distributed column values are generated in advance by the owner of the database, the query for corresponding records thereof can be offloaded to various slave databases to the maximum extent.

II. Column Values of any Column of the Query Object.

When an external query request is received, the values of any column of a query object that corresponds to the query request may also be used as distributed column values of the query object. The values of a column specified by the query request may be used as the distributed column values.

For example, for a query of population data of various cities, all city name values in a city column of the population data table may be queried first, and the city name values may be used as the distributed column value.

Values of a column of a query object that corresponds to the query request are used as distributed column values, so that information of the query request can be fully utilized. In this scenario, there is no need to generate and maintain a distributed column value table in advance, and reducing the maintenance workload of the database can be achieved.

III. Values of a First Column of the Query Object.

For a query request not specifying a column of a query object, values of a first column of the query object to be queried may be used as distributed column values. In this scenario, the values of a first column of the query object are used as distributed column values, so that if a query request does not specify a column of a query object, values of a column the query object definitely has can be used as the distributed column values, thereby simplifying the maintenance work of the database.

IV. Values of a Column Specified by the Query Request.

When an external query request is received, the values of a column included in the query request may further be used as distributed column values of the query object.

For example, for a query of population data of various cities, if the query request specifies the "city," all city name values in a city column of the population data table may be queried first, and the city name values may be used as distributed column values.

Values of a column specified by the query request are used as distributed column values, so that information of the query request can be fully utilized. No need exists to generate and maintain a distributed column value table in advance, and the effect of reducing the maintenance workload of the database can be achieved.

For a query of a plurality of tables of the database, values of columns having associated conditions may be selected as distributed column values. For example, for the case where query objects corresponding to a query request are tables t1 and t2, where a column c1 of the table t1 is associated with a column c2 of table t2, the column c1 of the table t1 and the column c2 of table t2 may be respectively selected as distributed columns of t1 and t2. The operation of acquiring distributed column values is select * from t1, t2, where t1.c1=t2.c2.

The splitting of the query request into query tasks for slave databases having non-overlapping query ranges according to distributed column values is not only applicable to a query for a single query object, but also applicable to a query for a plurality of query objects, and has universal applicability.

Method 2: In a second method, the query request is split into query operations for slave databases having non-overlapping query ranges according to unique keys of records of a query object that corresponds to the query request.

The unique key refers to the value of a key that corresponds to each record of a query object, and the key value of each record differs. A value domain of key values may be divided in advance into a plurality of value domains having the same number as that of slave databases participating in the query, and it is specified that each slave database (indexed according to a unique key) accesses data of the corresponding value domain.

For example, c1 is the unique key, for the three slave databases in this embodiment, three value domains [0, 60], [60, 100], and [100, 150] are divided, and each slave database separately accesses record data of the corresponding value domain.

This method is suitable for a query for a single query object.

Method 3: In a third method, the query request is split into query operations for slave databases having non-overlapping query ranges according to numbers of data pages of a query object that corresponds to the query request.

Numbers of data pages of a query object may be divided in advance into a plurality of ranges having the same number as that of slave databases participating in the query. For example, the numbers of data pages of the query object are 0 to 1500, and three slave databases exist; then the numbers may be divided into three ranges [0-500], [500, 1000], and [1000-1500], which are respectively processed by the three slave databases.

This manner is suitable for a query for a single query object.

The query processing unit (U105) performs the query operations on the slave databases (U102, U103, and U104), and the slave databases (U102, U103, and U104) return results of the query operations to the query processing unit (U105).

For example, the slave database (U102) returns the result of the query operation on distributed column values A0, B0, C0, D0 and so on of the population data table to the query processing unit (U105); the slave database (U103) returns the result of the query operation on distributed column values A1, B1, C1, D1 and so on of the population data table to the query processing unit (U105); and the slave database (U104) returns the result of the query operation on distributed column values A2, B2, C2, D2 and so on of the population data table to the query processing unit (U105).

After receiving the execution results of the query operations, the query processing unit (U105) externally provides a query result to a requester of the query request.

For example, the query processing unit (U105) separately receives the execution result, returned by the slave database (U102), of the query operation on records having distributed column values A0, B0, C0, D0 and so on of the population data table; the execution result, returned by the slave database (U103), of the query operation on records having distributed column values A1, B1, C1, D1 and so on of the population data table; and the execution result, returned by the slave database (U104), of the query operation on records having distributed column values A2, B2, C2, D2 and so on of the population data table, and then returns the execution results to the requester of the external query request.

At this point, the database system provided in this embodiment has generated a complete response to the external query request.

The query processing unit of the database system provided in this embodiment may further be configured to send a query task, receive a query task and results of query operations sent by other query processing units, execute a database query operation specified by the received query task, integrate the results of the query operations, and provide a result of the query operation on the slave database or a result after the integration to a receiver specified by the query task.

The integrating query results of the query operations includes sorting or merging the execution results of the query operations or the like.

The query processing unit (U105) may further dynamically determine the number of slave databases participating in the query according to statistical information of data involved in the query (e.g., the size of a table corresponding to the query), send the split query operation instructions to the determined slave databases to perform the query operations, and return query results. In short, the query processing unit may determine how many slave databases participate in the query according to the amount of work involved in a query request or the size of a query object. In the case of a small amount of work or a small data table corresponding to the query, a small number of slave databases may be assigned or it is even possible for one slave database to participate in the query operation; on the contrary, as many slave databases as possible are assigned to participate in the query operation to balance or balance as much as possible the work of each slave database executing the query operation, thereby improving efficiency.

The query processing unit may be positioned on the same physical node as the slave database. That is, both a slave database and a query processing unit are provided on the node of each slave database. In this way, the capability of a plurality of slave databases can be fully utilized to process large, complex query requests for databases.

For example, in addition to the master database, slave databases, and query processing unit described above, the database system may further include query processing units corresponding to the slave databases, the query processing units being respectively positioned on nodes where the corresponding slave databases reside. For a query of population data of several cities, an external query request received by the query processing unit (U105) is select c1, count (c2) from t1 group by c1. The column c1 of the population data table t1 is city names, and the column c2 is population size values.

The query processing unit (U105) converts the external query request into query tasks for the slave databases (U102, U103, and U104) and distributes the query tasks to query processing units corresponding to the slave databases, where the query tasks may include query operations for slave databases having non-overlapping query ranges.

The query processing units corresponding to the slave databases receive the query tasks, and if the query tasks do not include query operations for slave databases having non-overlapping query ranges, then the query operations for the slave databases having non-overlapping query ranges are formed according to the received query tasks and the corresponding slave databases.

For example, the query tasks formed for the query processing units corresponding to the slave databases of the database system are as follows: the query task corresponding to the query processing unit on the node where the slave database (U102) is located is querying population size data of the cities having distributed column values A0, B0, C0, D0 and so on, and sending a query result to the query processing unit on the node where the slave database (U104) is located.

The query task corresponding to the query processing unit on the node where the slave database (U103) is located is querying population size data of the cities having distributed column values A1, B1, C1, D1 and so on, and sending a query result to the query processing unit on the node where the slave database (U104) is located.

The query task corresponding to the query processing unit on the node where the slave database (U104) is located is querying population size data of the cities having distributed column values A2, B2, C2, D2 and so on, receiving the population size data of the cities sent by the slave database (U102) and the slave database (U103), calculating a sum of the population sizes of the cities, and sending a result to the query processing unit (U105).

Each query processing unit positioned on the same node as each slave database executes the query operation corresponding to the corresponding query task on the slave database on the current node: the query processing unit on the node where the slave database (U102) is located executes, on the slave database (U102), an operation of querying population size data of the cities having distributed column values A0, B0, C0, D0 and so on, and sends an execution result of the query operation to the query processing unit on the node where the slave database (U104) is located.

The query processing unit on the node where the slave database (U103) is located executes, on the slave database (U103), an operation of querying population size data of the cities having distributed column values A1, B1, C1, D1 and so on, and sends an execution result of the query operation to the query processing unit on the node where the slave database (U104) is located.

The query processing unit on the node where the slave database (U104) is located executes, on the slave database (U104), an operation of querying population size data of the cities having distributed column values A2, B2, C2, D2 and so on, receives the population size data of the cities sent from the nodes where the slave databases (U102) and (U103) are located, integrates the received population size data of the cities to obtain population size data of the cities, and sends the integrated population size data of the cities to the query processing unit (U105).

Figure 2:
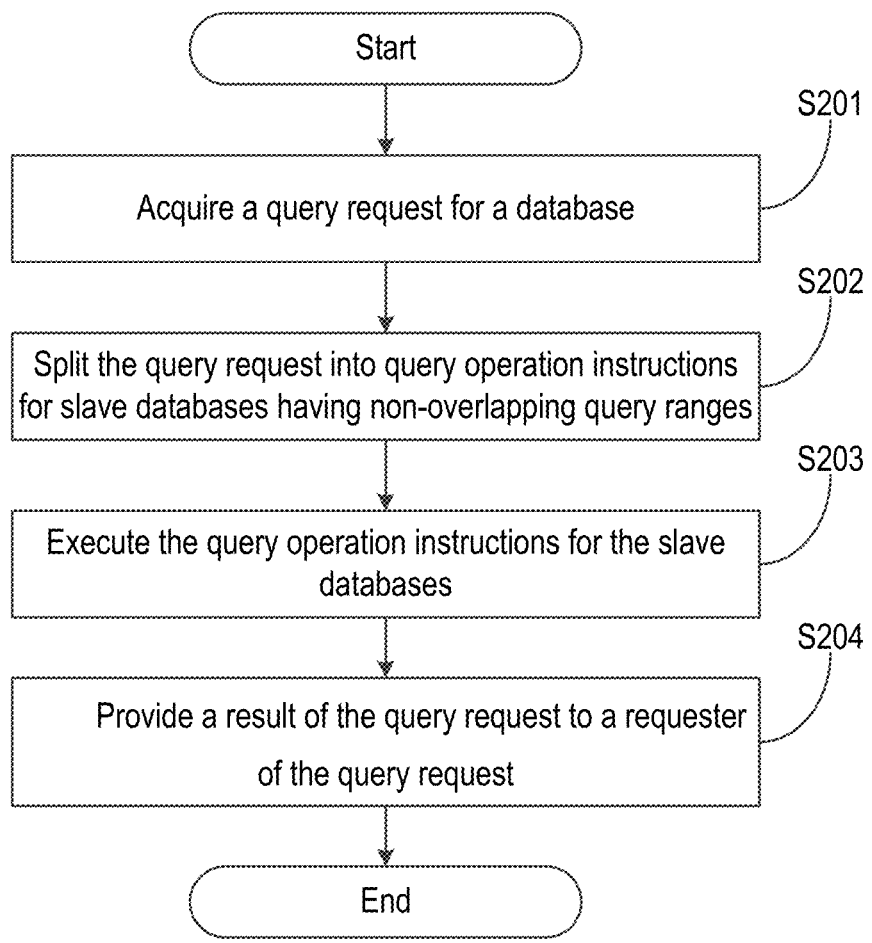
FIG. 2 is a flow diagram illustrating a method for querying a database according to some embodiments of the disclosure.

A second embodiment of the disclosure provides a method for querying a database, a schematic flowchart of which is shown in FIG. 2, including the following steps.

Step S201: acquire or receive a query request for a database.

The query request may usually include information of a query object of specified database information. The information of the query object may include information such as the name of a table that needs to be queried and values of a columns of a table that need to be queried.

Reference may be made to the relevant description of the query processing unit described in connection with FIG. 1 and other figures for the detailed description of this step. Such detail is not repeated herein.

Step S202: split the query request query operation instructions for slave databases having non-overlapping query ranges.

The query operations for slave databases having non-overlapping query ranges refer to that the query operations executed on the slave databases do not overlap. That is, two different slave databases are queried for different records.

There may be many manners for splitting the query request into query operations for slave databases having non-overlapping query ranges. This embodiment provides the following methods for splitting the query request into query operations for slave databases having non-overlapping query ranges.

Method 1: the query request is split into query operation instructions for slave databases having non-overlapping query ranges according to distributed column values corresponding to a query object.

The distributed column values corresponding to a query object that corresponds to the request include at least one item of the following:

I. Pre-saved distributed column values of the query object;
II. Values of any column of the query object;
III. Values of a first column of the query object; and
IV. Values of a column specified by the query request.

For the corresponding detailed description, reference may be made to the relevant description of the query processing unit in the description of FIG. 1, which is not repeated herein.

Method 2: the query request is split into query operation instructions for slave databases having non-overlapping query ranges according to unique keys of records of a query object that corresponds to the query request.

Method 3: the query request is split into query operation instructions for slave databases having non-overlapping query ranges according to numbers of data pages of a query object that corresponds to the query request.

Step S203: execute the query operation instructions for the slave databases.

Reference may be made to the relevant description of the query processing unit described in connection with FIG. 1 and other figures for the detailed description of this step. Such detail is not repeated herein.

After this step, a step of integrating the results of the query operations may further be included. For relevant description, reference may be made to the relevant description in the description of FIG. 1, which is not repeated herein.

Step S204: provide a result of the query request to a requester of the query request.

A result of a request for querying a database is returned to a requester of the request according to execution results of query operations for slave databases or a result of integration. In this way, the query for the database this time is accomplished.

Figure 3:
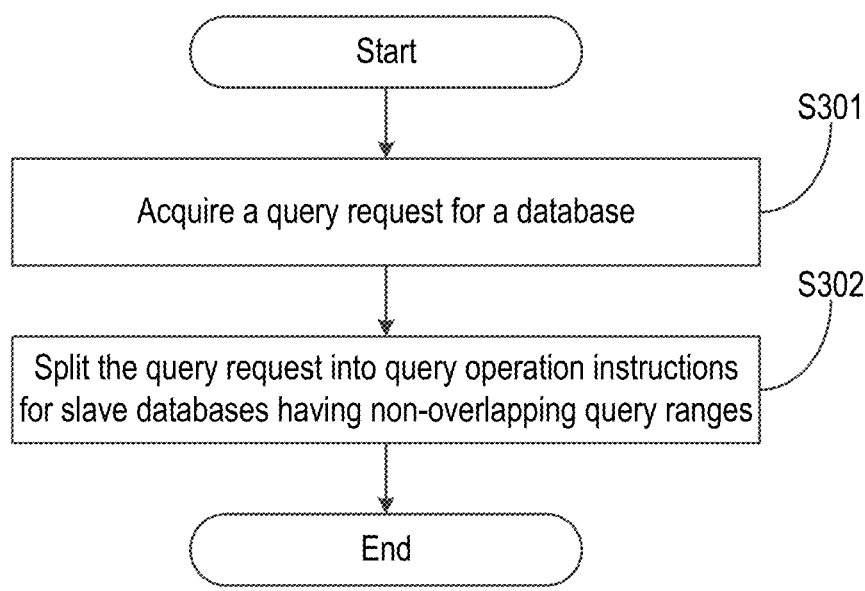
FIG. 3 is a flow diagram illustrating a method for assigning a query operation according to some embodiments of the disclosure.

A third embodiment of the disclosure provides a method for assigning a query operation, a schematic flowchart of which is shown in FIG. 3, including the following steps.

Step S301: acquire or receive a query request for a database.

Reference may be made to the relevant description of the query processing unit described in connection with FIG. 1 and other figures for the detailed description of this step. Such detail is not repeated herein.

Step S302: split the query request into query operation instructions for slave databases having non-overlapping query ranges.

Many methods may exist for splitting the query request into query operations for slave databases having non-overlapping query ranges. This embodiment provides the following methods for splitting the query request into query operations for slave databases having non-overlapping query ranges.

Method 1: the query request is split into query operation instructions for slave databases having non-overlapping query ranges according to distributed column values corresponding to a query object.

The distributed column values corresponding to a query object include at least one item of the following:
I. Pre-saved distributed column values of the query object;
II. Values of any column of the query object;
III. Values of a first column of the query object; and
IV. Values of a column specified by the query request.

Method 2: the query request is split into query operation instructions for slave databases having non-overlapping query ranges according to unique keys of records of a query object that corresponds to the query request.

Manner 3: the query request is split into query operation instructions for slave databases having non-overlapping query ranges according to numbers of data pages of a query object that corresponds to the query request.

For the corresponding detailed description, reference may be made to the relevant description of FIG. 1, which is not repeated herein.

Figure 4:
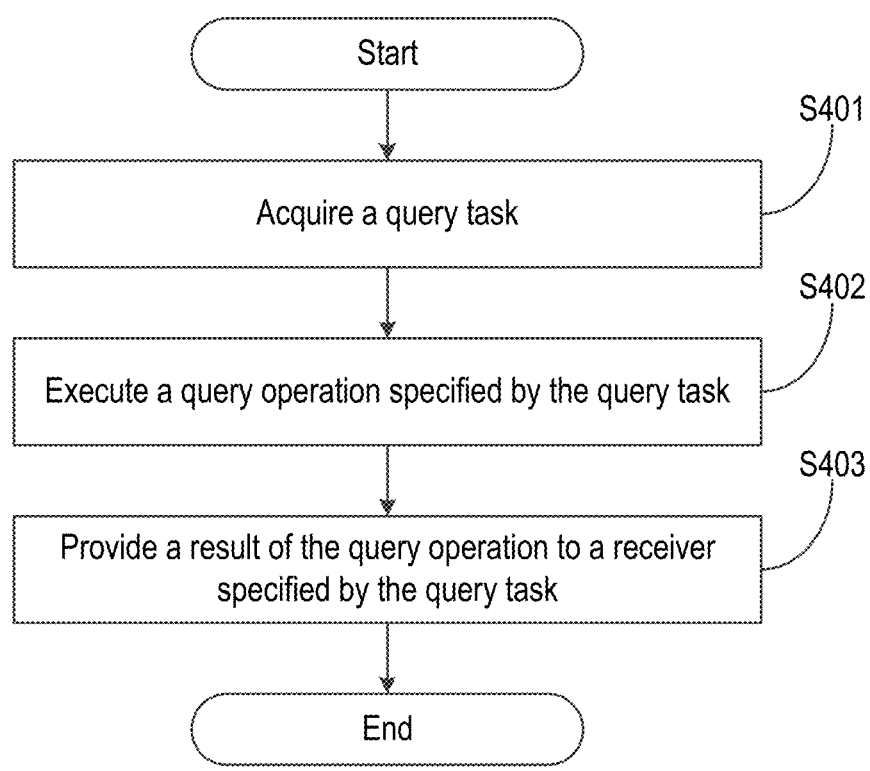
FIG. 4 is a flow diagram illustrating a method for executing a database query according to some embodiments of the disclosure.

A fourth embodiment of the disclosure provides a method for executing a database query, a schematic flow diagram of which is shown in FIG. 4 and includes the following steps.

Step S401: acquire or receive a query task.

Step S402: execute a query operation specified by the query task.

Step S403: provide a result of the query operation to a receiver specified by the query task.

Reference may be made to the relevant description of the query processing unit described in connection with FIG. 1 and other figures for detail regarding the steps in the embodiment illustrated in FIG. 5. Such detail is not repeated herein.

Figure 5:
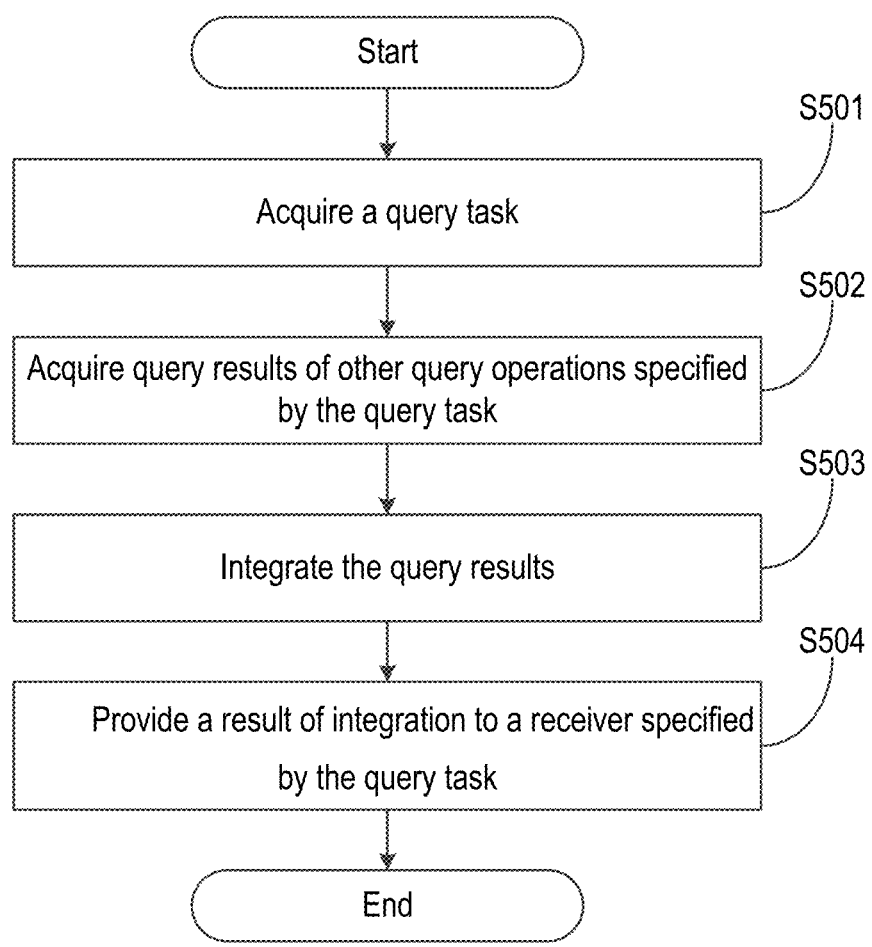
FIG. 5 is a flow diagram illustrating a method for performing a database query according to some embodiments of the disclosure.

A fifth embodiment of the disclosure provides a method for performing a database query, a flow diagram of which is shown in FIG. 5 and includes the following steps.

Step S501: acquire or receive a query task.

Step S502: acquire query results of other query operations specified by the query task.

Step S503: integrate the query results.

In some embodiments, before this step S503, a step of executing a query operation specified by the query task to obtain a query result may further be included.

Step S504: provide a result of integration to a receiver specified by the query task.

Reference may be made to the relevant description of the query processing unit described in connection with FIG. 1 and other figures for detail regarding the steps in the embodiment illustrated in FIG. 5. Such detail is not repeated herein.

Figure 6:
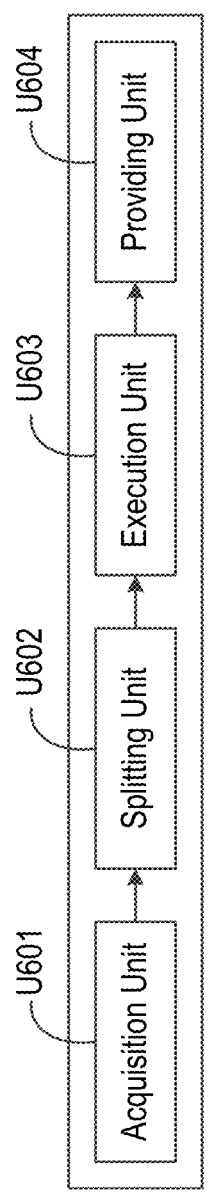
FIG. 6 is a block diagram of an apparatus for querying a database according to some embodiments of the disclosure.

A sixth embodiment of the disclosure provides an apparatus for querying a database, a block diagram of which is shown in FIG. 6, including an acquisition unit (U601), a splitting unit (U602), an execution unit (U603), and a providing unit (U604).

In the illustrated embodiment, the acquisition unit (U601) is configured to acquire or receive a query request for querying a database.

In the illustrated embodiment, the splitting unit (U602) is configured to split the query request into query operations for slave databases having non-overlapping query ranges.

In some embodiments, the splitting unit is configured to split the query request into query tasks for slave databases having non-overlapping query ranges according to distributed column values corresponding to a query object. The distributed column values corresponding to a query object include at least one item of the following: pre-saved distributed column values of the query object; values of any column of the query object; values of a first column of the query object; and values of a column specified by the query request.

In some embodiments, the splitting unit may further be configured to split the query request into query operations for slave databases having non-overlapping query ranges according to the unique keys of records of a query object that corresponds to the query request.

In some embodiments, the splitting unit may further be configured to split the query request into query operations for slave databases having non-overlapping query ranges according to numbers of data pages of a query object that corresponds to the query request.

In the illustrated embodiment, the execution unit (U603) is configured to execute the query operations for the slave databases.

In the illustrated embodiment, the providing unit (U604) is configured to provide a query result of the query request to a requester of the request.

The apparatus provided in the embodiment illustrated in FIG. 6 may further include an integration unit configured to integrate the results of the query operations.

Figure 7:
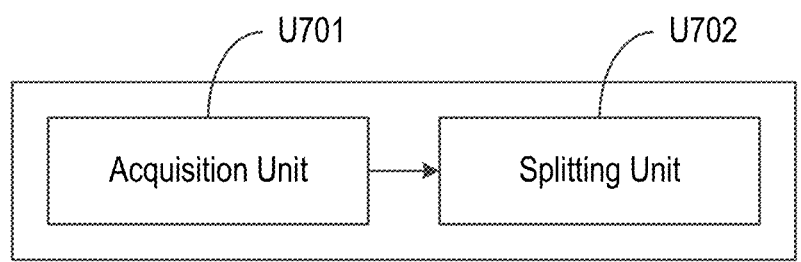
FIG. 7 is a block diagram of an apparatus for assigning a query operation according to some embodiments of the disclosure.

A seventh embodiment of the disclosure provides an apparatus for assigning a query operation, a block diagram of which is shown in FIG. 7, including an acquisition unit (U701) and a splitting unit (U702).

In the illustrated embodiment, the acquisition unit (U701) is configured to acquire or receive a query request for a database, and the splitting unit (U702) is configured to split the query request into query operations for slave databases having non-overlapping query ranges.

In some embodiments, the splitting unit (U702) may be configured to split the query request into query tasks for slave databases having non-overlapping query ranges according to distributed column values corresponding to a query object. The distributed column values include at least one of: pre-saved distributed column values of the query object; values of any column of the query object; values of a first column of the query object; and values of a column specified by the query request.

In some embodiments, the splitting unit (U702) may further be configured to split the query request into query operations for slave databases having non-overlapping query ranges according to unique keys of records of a query object that corresponds to the query request.

In some embodiments, the splitting unit (U702) may further be configured to split the query request into query operations for slave databases having non-overlapping query ranges according to numbers of data pages of a query object that corresponds to the query request.

Figure 8:
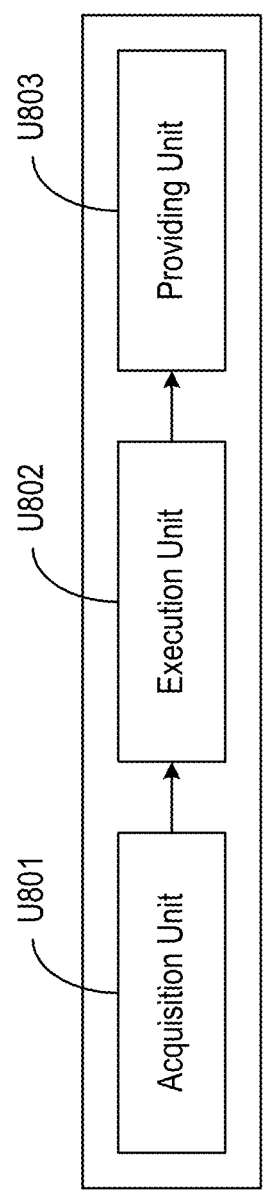
FIG. 8 is a block diagram of an apparatus for executing a database query according to some embodiments of the disclosure.

An eighth embodiment of the disclosure provides an apparatus for executing a database query, a block diagram of which is shown in FIG. 8, including an acquisition unit (U801), an execution unit (U802), and a providing unit (U803). In the illustrated embodiment, the acquisition unit (U801) is configured to acquire or receive a query task. In the illustrated embodiment, the execution unit (U802) is configured to execute a query operation specified by the query task. In the illustrated embodiment, the providing unit (U803) is configured to provide a result of the query operation to a receiver specified by the query task.

Figure 9:
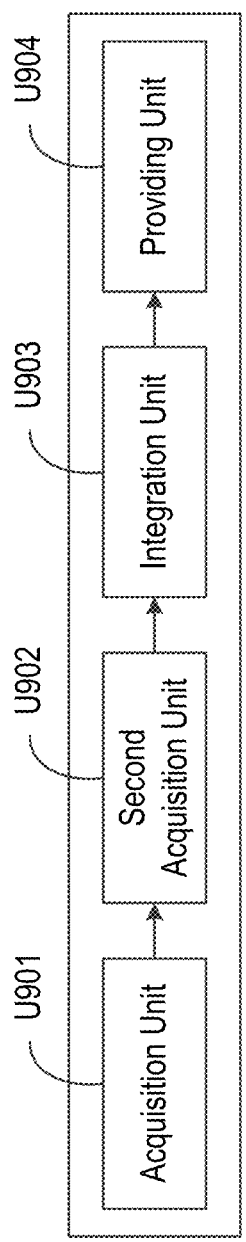
FIG. 9 is a block diagram of an apparatus for performing a database query according to some embodiments of the disclosure.

A ninth embodiment of the disclosure provides an apparatus for performing a database query, a block diagram of which is shown in FIG. 9, including an acquisition unit (U901), a second acquisition unit (U902), an integration unit (U903), and a providing unit (U904). In the illustrated embodiment, the acquisition unit (U901) is configured to acquire or receive a query task. In the illustrated embodiment, the second acquisition unit (U902) is configured to acquire query results of other query operations specified by the query task. In the illustrated embodiment, the integration unit (U903) is configured to integrate the query results. In the illustrated embodiment, the providing unit (U904) is configured to provide a result of integration to a receiver specified by the query task.

The apparatus for performing a database query provided in this embodiment may further include an execution unit. In this embodiment, the execution unit is configured to execute a query operation specified by the query task to obtain a query result.

The disclosed embodiments have been described above through example embodiments, but the disclosed embodiments are not intended to be limited thereto. Possible variations and modifications can be made by those skilled in the art without departing from the spirit and scope of the disclosure. Therefore, the scope of the disclosure shall be limited by the claims.

In a typical configuration, the computing device includes one or a plurality of processors (CPUs), input/output interfaces, network interfaces, and memories.

The memory may include a computer-readable medium in the form of a non-permanent memory, a random-access memory (RAM) and/or non-volatile memory or the like, such as a read-only memory (ROM) or a flash memory (e.g., flash RAM). The memory is an example of a computer-readable medium.

The computer-readable medium includes permanent and non-permanent, movable and non-movable media that can achieve information storage by means of any methods or techniques. The information may be computer-readable instructions, data structures, modules of programs or other data. Examples of a storage medium of a computer include, but are not limited to, a phase change memory (PCRAM), a static random-access memory (SRAM), a dynamic random-access memory (DRAM), other types of RAM devices, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessible by a computing device. According to the definitions herein, the computer-readable medium does not include non-transitory computer-readable media, such as a modulated data signal and a carrier wave.

Those skilled in the art should understand that the disclosed embodiments may be implemented as a method, system, or computer program product. Therefore, the disclosed embodiments may be implemented fully in hardware, fully in software, or using a combination software and hardware. Moreover, the disclosed embodiments may be implemented as a computer program product implemented on one or a plurality of computer-usable storage media (including, but not limited to, a magnetic disk memory, a CD-ROM, an optical memory, and so on) containing computer-usable program code therein.

What is claimed is:

1. A method comprising:
receiving, by a processor, a query request for a database from a requester;
splitting, by the processor, the query request into a plurality of query operation instructions having non-overlapping query ranges based on distributed column values corresponding to a query object corresponding to the query request;
issuing, by the processor, the plurality of query operation instructions to corresponding slave databases, the corresponding slave databases returning different records responsive to a received query operation instruction; and
returning, by the processor, a result of the query request to the requester, the result generated based on the issuing of the plurality of query operation instructions.

2. The method of claim 1, the splitting the query request based on the distributed column values comprising splitting the query request based on values selected from the group consisting of pre-saved distributed column values of the query object; values of a column of the query object; values of a first column of the query object; and values of a column specified by the query request.

3. The method of claim 1, the splitting the query request comprising splitting the query request based on unique keys of records of a query object corresponding to the query request.

4. The method of claim 1, the splitting the query request comprising splitting the query request based on numbers of data pages of a query object corresponding to the query request.

5. The method of claim 1, the issuing each of the plurality of query operation instructions comprising determining a number of slave databases participating in the query according to statistical information of data involved in the query and issuing the query operation instructions on the determined slave databases.

6. The method of claim 1, further comprising generating the result by integrating return values of each of the plurality of query operation instructions.

7. A device comprising:
a processor; and
a storage medium for tangibly storing thereon program logic for execution by the processor, the stored program logic causing the processor to perform the operations of:
receiving, by a processor, a query request for a database from a requester;
splitting, by the processor, the query request into a plurality of query operation instructions having non-overlapping query ranges based on distributed column values corresponding to a query object corresponding to the query request;
issuing, by the processor, the plurality of query operation instructions to corresponding slave databases, the corresponding slave databases returning different records responsive to a received query operation instruction; and
returning, by the processor, a result of the query request to the requester, the result generated based on the issuing of the plurality of query operation instructions.

8. The device of claim 7, the splitting the query request based on the distributed column values comprising splitting the query request based on values selected from the group consisting of pre-saved distributed column values of the query object; values of a column of the query object; values of a first column of the query object; and values of a column specified by the query request.

9. The device of claim 7, the splitting the query request comprising splitting the query request based on unique keys of records of a query object corresponding to the query request.

10. The device of claim 7, the splitting the query request comprising splitting the query request based on numbers of data pages of a query object corresponding to the query request.

11. The device of claim 7, the issuing each of the plurality of query operation instructions comprising determining a number of slave databases participating in the query according to statistical information of data involved in the query and issuing the query operation instructions on the determined slave databases.

12. A non-transitory computer-readable storage medium for tangibly storing computer program instructions capable of being executed by a computer processor, the computer program instructions defining the steps of:
receiving, by a processor, a query request for a database from a requester;
splitting, by the processor, the query request into a plurality of query operation instructions having non-overlapping query ranges based on distributed column values corresponding to a query object corresponding to the query request;
issuing, by the processor, the plurality of query operation instructions to corresponding slave databases, the corresponding slave databases returning different records responsive to a received query operation instruction; and
returning, by the processor, a result of the query request to the requester, the result generated based on the issuing of the plurality of query operation instructions.

13. The computer-readable storage medium of claim 12, the splitting the query request based on the distributed column values comprising splitting the query request based on values selected from the group consisting of pre-saved distributed column values of the query object; values of a column of the query object; values of a first column of the query object; and values of a column specified by the query request.

14. The computer-readable storage medium of claim 12, the splitting the query request comprising splitting the query request based on unique keys of records of a query object corresponding to the query request.

15. The computer-readable storage medium of claim 12, the splitting the query request comprising splitting the query request based on numbers of data pages of a query object corresponding to the query request.

16. The computer-readable storage medium of claim 12, the issuing each of the plurality of query operation instructions comprising determining a number of slave databases participating in the query according to statistical information of data involved in the query and issuing the query operation instructions on the determined slave databases.

17. The computer-readable storage medium of claim 12, the computer program instructions further defining the step of generating the result by integrating return values of each of the plurality of query operation instructions.

* * * * *